(12) United States Patent
Barnes

(10) Patent No.: US 8,580,882 B1
(45) Date of Patent: Nov. 12, 2013

(54) GLOVE-FORMING SOLUTION

(76) Inventor: Joesph L. Barnes, Magna, UT (US)

( * ) Notice: Subject to any disclaimer, the term of this patent is extended or adjusted under 35 U.S.C. 154(b) by 477 days.

(21) Appl. No.: 12/855,569

(22) Filed: Aug. 12, 2010

(51) Int. Cl.
- *C04B 35/634* (2006.01)
- *C08K 5/09* (2006.01)
- *C08K 3/20* (2006.01)
- *C08F 283/00* (2006.01)
- *C08J 3/02* (2006.01)

(52) U.S. Cl.
USPC .......................................... 524/457; 524/322

(58) Field of Classification Search
USPC .......................................... 524/315, 322, 457
See application file for complete search history.

(56) References Cited

U.S. PATENT DOCUMENTS

| | | |
|---|---|---|
| 3,896,807 A | 7/1975 | Buchalter |
| 4,122,554 A | 10/1978 | Stager |
| 4,775,372 A | 10/1988 | Wilberg |
| D359,381 S | 6/1995 | Henriquez |
| 5,567,420 A * | 10/1996 | McEleney et al. .............. 424/60 |
| 5,614,202 A | 3/1997 | DeFina |
| D426,894 S | 6/2000 | Picchione, II |
| 6,117,119 A | 9/2000 | Gould |
| 6,692,756 B2 | 2/2004 | Chou |
| 8,393,499 B1 * | 3/2013 | Sholem .......................... 222/135 |
| 2004/0122382 A1 * | 6/2004 | Johnson et al. ................ 604/292 |
| 2005/0127552 A1 * | 6/2005 | Modha et al. .................. 264/129 |
| 2007/0240247 A1 | 10/2007 | Beck |
| 2008/0196143 A1 | 8/2008 | Chou |
| 2009/0041697 A1 * | 2/2009 | Klofta et al. .................... 424/65 |

\* cited by examiner

*Primary Examiner* — Angela C Scott

(57) ABSTRACT

A glove-forming liquid solution that when rubbed on a user's hand forms a solid glove around the hand, the solution features a percentage latex, a percentage water, a percentage aloe-barbadensis leaf juice, a percentage glycerin, a percentage stearic acid, a percentage glyceryl, a percentage cetyl alcohol, a percentage safflower seed oil, and a percentage lanolin.

1 Claim, 3 Drawing Sheets

GLOVE-FORMING SOLUTION

FIELD OF THE INVENTION

The present invention is directed to latex and materials for constructing gloves, more particularly to a solution that solidifies to immediately construct a glove when rubbed on a user's hands.

BACKGROUND OF THE INVENTION

Gloves serve a variety of purposes, for example protecting individuals hands from becoming dirty (e.g., during cleaning, fuel pumping, car maintenance, etc.) and from contacting germs. However, many individuals lack quick access to gloves. The present invention features a glove-forming solution that when rubbed on a user's hand forms a solid glove around the hand. When the user is finished, he/she can peel the glove off and discard it in a waste receptacle. The glove-forming solution comprises a mixture of latex, lotion, among other materials. The glove-forming solution also provides a means of sanitizing an individual's hands to help prevent the spread of germs.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Referring now to FIG. 1-5, the present invention features a glove-forming liquid solution that when rubbed on a user's hand forms a solid glove 100 around the hand. The glove 100 made from the glove-forming solution provides a convenient means of protecting, moisturizing, and sanitizing one's hands when needed and eliminates the need to carry gloves.

Figure 1:
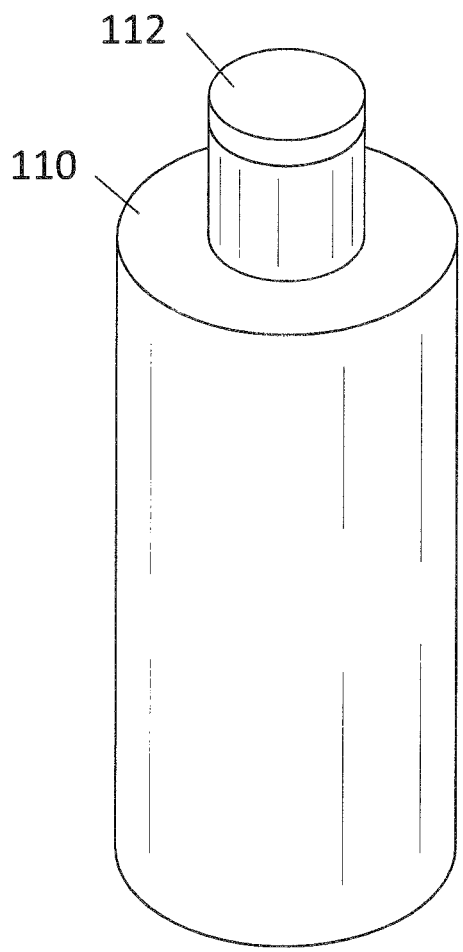
FIG. 1 is a perspective view of a bottle for holding and dispensing of the glove-forming solution of the present invention.
Figure 2:
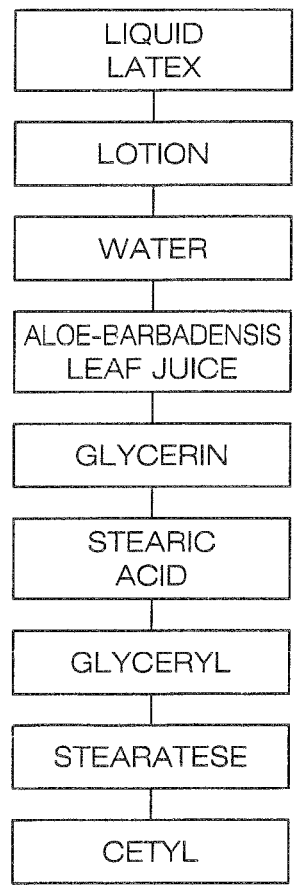
FIG. 2 is a schematic representation of the components of the glove-forming solution of the present invention.
Figure 3:
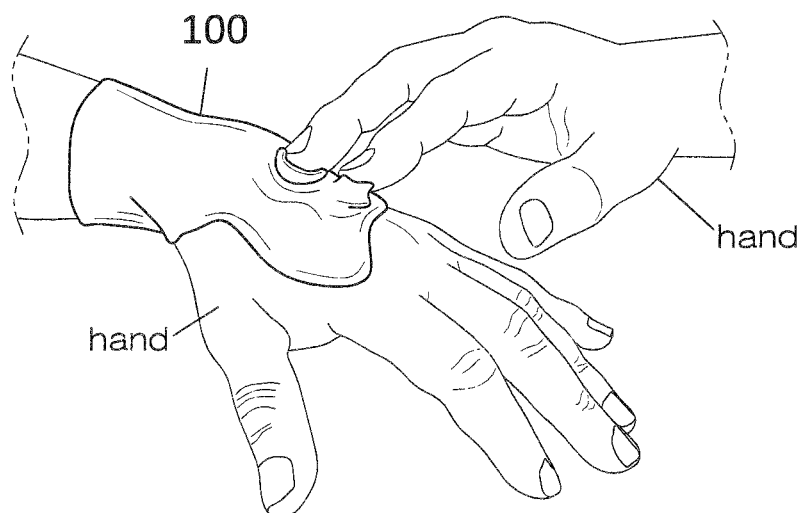
FIG. 3 is a first in-use view of a glove being made from the glove-forming solution of the present invention on a user's hand.
Figure 4:
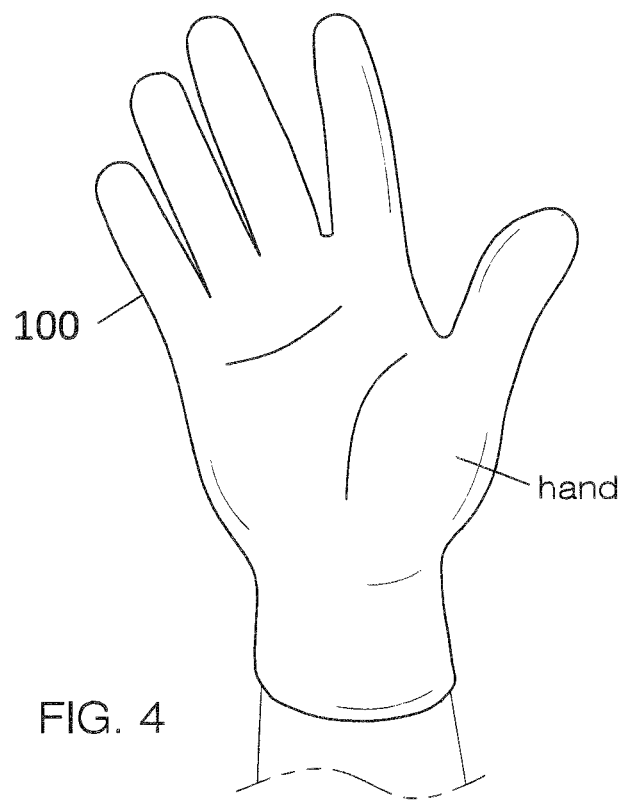
FIG. 4 is a second in-use view of a glove made from the glove-forming solution of the present invention.
Figure 5:
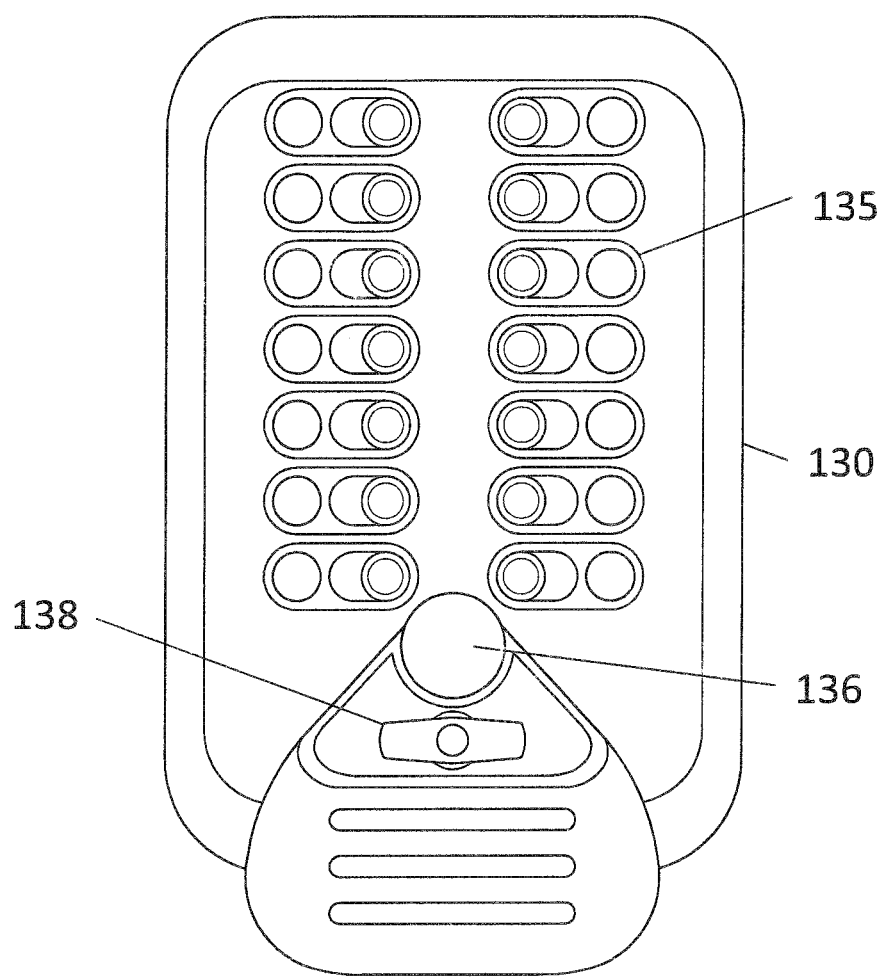
FIG. 5 is a front view of a dispensing system for holding and dispensing of the glove-forming solution of the present invention.

In some embodiments, the glove-forming solution is stored in a bottle 110 (e.g., a leak-proof bottle with cap 112). The present invention is not limited to the bottle 110 described in FIG. 1. For example, in some embodiments, the glove-forming solution is stored and dispensed from a dispensing system 130 as shown in FIG. 5. The dispensing system 130 may comprise a variety of buttons 135 for dispensing various colors or scents of glove-forming solution. Optionally, the dispensing system 130 is coin-operated with a coin slot 136 and a handle 138. Coin-operated devices are well known to one of ordinary skill in the art.

When the user is finished, he/she can peel the glove off and discard it in a waste receptacle. The glove-forming solution comprises a mixture of latex, lotion, among other materials. The glove-forming solution also provides a means of sanitizing an individual's hands to help prevent the spread of germs.

The glove-forming solution of the present invention comprises a percentage of latex, water, aloe-barbadensis leaf juice, glycerin, stearic acid, glyceryl, cetyl alcohol, safflower seed oil, and lanolin. The glove-forming solution of the present invention may further comprise lotion or moisturizer, other stearates, glyceryl, and/or a pH-balanced liquid. For example, in some embodiments, the glove-forming solution comprises about 25% latex, about 25% water, the remaining portion being aloe-barbadensis leaf juice, glycerin, stearic acid, glyceryl, cetyl alcohol, safflower seed oil, and lanolin.

Below is a list of examples of formulations for the glove-forming solution of the present invention showing a percent latex, a percent water, and a percent other mixture formed be one or more (two or more, three or more, four or more, five or more, six or more) of the following ingredients: aloe-barbadensis leaf juice, glycerin, stearic acid, cetyl alcohol, safflower seed oil, and lanolin. The present invention is not limited to these examples. Values may be plus or minus 10%, for example a solution comprising about 50% latex may comprise between 45 and 55% latex.

| EXAMPLE | % LATEX | % WATER | % OTHER (E.G., ALOE-BARBADENSIS LEAF JUICE, GLYCERIN, STEARIC ACID, CETYL ALCOHOL, SAFFLOWER SEED OIL, LANOLIN) |
|---|---|---|---|
| 1 | 25 | 25 | 50 |
| 2 | 30 | 30 | 40 |
| 3 | 40 | 40 | 20 |
| 4 | 45 | 45 | 10 |
| 5 | 50 | 40 | 10 |
| 6 | 60 | 30 | 10 |
| 7 | 55 | 30 | 15 |
| 8 | 60 | 35 | 5 |
| 9 | 20 | 70 | 10 |
| 10 | 30 | 60 | 10 |

The glove-forming solution may be constructed in a variety of scents including but not limited to mint, citrus, cherry, eucalyptus, vanilla, lavender, the like, or a combination thereof. The glove-forming solution may be constructed in a variety of colors including but not limited to pink, blue, gray, black, orange, yellow, green, and clear. In some embodiments, the color represents the scent of the solution, for example green may represent mint, red may represent cherry, orange may represent citrus, etc.

As used herein, the term "about" refers to plus or minus 10% of the referenced number. For example, an embodiment wherein the solution comprises about 25% water includes an embodiment wherein the solution comprises between 22.5 and 27.5% water.

The disclosures of the following U.S. Patents are incorporated in their entirety by reference herein: U.S. Pat. Application No. 2007/0240247; U.S. Pat. No. 4,122,554; U.S. Pat. No. 3,896,807; U.S. Pat. No. 4,775,372; U.S. Pat. Application No. 2008/0196143; U.S. Pat. No. 6,692,756; U.S. Pat. No. 5,614,202; U.S. Pat. No. 6,117,119.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A glove-forming liquid solution consisting of a mixture of latex, water, and a combination formed from at least five of the following: an aloe-barbadensis leaf juice, a glycerin, a stearic acid, a glyceryl, a cetyl alcohol, a safflower seed oil, and a lanolin.

* * * * *